(12) United States Patent
Huang et al.

(10) Patent No.: US 9,070,178 B2
(45) Date of Patent: Jun. 30, 2015

(54) METHOD AND SYSTEM FOR ORGANIZING TOPOLOGY ELEMENTS FOR BETTER COMPRESSION

(75) Inventors: Jianbing Huang, Shoreview, MN (US); Michael B. Carter, Ames, IA (US); Andreas Johannsen, Ames, IA (US); Brett Harper, Ames, IA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2430 days.

(21) Appl. No.: 11/837,371

(22) Filed: Aug. 10, 2007

(65) Prior Publication Data

US 2008/0043030 A1 Feb. 21, 2008

Related U.S. Application Data

(60) Provisional application No. 60/822,133, filed on Aug. 11, 2006.

(51) Int. Cl.
*G06T 9/00* (2006.01)
*G06T 17/20* (2006.01)
*G06T 17/00* (2006.01)

(52) U.S. Cl.
CPC .............. *G06T 9/00* (2013.01); *G06T 2210/32* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 5,412,762 A * | 5/1995 | Kondo | 345/420 |
| 6,167,159 A | 12/2000 | Touma | |
| 6,191,791 B1 | 2/2001 | Dyer | |
| 6,606,095 B1 | 8/2003 | Lengyel | |
| 6,772,175 B2 * | 8/2004 | MacPherson | 707/792 |
| 6,961,469 B2 * | 11/2005 | Wittenbrink et al. | 382/232 |
| 6,985,910 B2 * | 1/2006 | Hollingsworth | 707/801 |
| 7,075,530 B2 * | 7/2006 | D'Amora | 345/419 |
| 7,181,685 B2 * | 2/2007 | Sandwith | 715/210 |
| 7,432,925 B2 * | 10/2008 | D'Amora | 345/419 |

FOREIGN PATENT DOCUMENTS

| | | |
|---|---|---|
| EP | 1321893 A3 | 1/2005 |
| WO | 99/64944 A2 | 12/1999 |
| WO | 2006/030288 A2 | 3/2006 |

OTHER PUBLICATIONS

Park et al., "Volumetric Multi-Texturing for Functionally Gradient Material Representation," Jun. 2001, ACM, p. 218.*
International Search Report for PCT/US2007/0075759 Dated Oct. 20, 2008.

(Continued)

*Primary Examiner* — Andrew Yang

(57) ABSTRACT

A system, method, and computer program for organizing elements for compression, comprising nesting a hierarchical topological structure having a plurality of elements; arranging said plurality of elements in a pattern to facilitate data compression; representing said pattern as four arrays; and compressing said plurality of elements from said arrays, and appropriate means and computer-readable instructions.

13 Claims, 6 Drawing Sheets

(56) References Cited

OTHER PUBLICATIONS

Masuda H et al: "Coding Topological Structure of 3D CAD Models" Computer Aided Design, Elsevier Publishers BV, Marking, GB, vol. 32, No. 5-6, May 1, 2000 pp. 367-375.

Wu D et al: "A Framework for Fast 3D Solid Model Exchange in Integrated Design Environment" Computers in Industry, Elsevier Science Publishers. Amsterdam, NL, vol. 56, No. 3, Apr. 1, 2005, pp. 289-304.

* cited by examiner

METHOD AND SYSTEM FOR ORGANIZING TOPOLOGY ELEMENTS FOR BETTER COMPRESSION

PRIORITY OF APPLICATION

The present application claims priority of U.S. provisional application Ser. No. 60/822,133 filed Aug. 11, 2006, which is incorporated herein by reference.

CROSS-REFERENCE TO RELATED APPLICATIONS

This application is related to U.S. Ser. No. 11/837,305, entitled "VISUAL FILE REPRESENTATION" and U.S. Ser. No. 11/837,402, entitled "METHOD AND SYSTEM FOR TRIMMED SURFACE TESSELLATION", both filed on even date herewith, which applications are incorporated by reference here.

TECHNICAL FIELD

The presently preferred embodiment of the innovations described herein relate generally to computer graphics software applications. More specifically, the presently preferred embodiment relates to system and method to organize topology elements for better compression.

BACKGROUND

Geometric representation that is capable of comprehensive functionality requirements is becoming increasingly important for engineering visualization industry as three-dimensional ("3D") data usage is being expanded to non-engineering purposes such as training, maintenance, etc. 3D representation can result in geometric files growing in size from "light weight" (also "light" or "lw") files can be less than 500 kilobytes to "heavy weight" (also "heavy" or "hw") files can be more than 2, 5 or 20 megabytes, for example. Lightweight 3D representation is crucial for collaborative visualization, where the visualization activity occurs in a distributed enterprise environment with the data being physically located on a different computer in the network (particularly if the visualization data must be transferred via LAN, WAN, email or any other low-bandwidth transmission medium).

Two important visualization functionalities are fast graphics display and accurate geometric analysis. Most visualization systems today use mesh representation in their file formats for maximum speed to reduce conversions from the file format to the graphics hardware, given that current graphics hardware is designed in a way such that its performance is best when the input data is represented in mesh format consisting of a collection of planar triangles. For better performance, several mesh representations of different details, usually call Level-Of-Detail or LOD, for the same part geometry may simultaneously exist in the file so that the graphics engine can choose to use less-detailed version for objects that are considered visually less significant in the scene. There are three major issues with LOD representation. First, LOD resolutions are fixed in the file format, so the curved surface may not appear smooth when zoomed-in, or magnified, thereby creating undesirable visual artifacts. Second, flat facets in mesh representation are merely linear approximations to the real object geometry. Some geometric operations, such as derivative computation, may not be meaningful at all for mesh, and other operations may not result in the desired accuracy. Third, LOD representations can be heavy even with state-of-art advanced compression. Fundamentally, flat facets, the basic element of LOD representation, does not exploit the intrinsic property of curved surface geometry.

An alternative format called Boundary Representation, or BREP, can be used for graphics display in the file format BREP contains accurate geometry description of object geometry in which the modeling primitives can be curved. BREP representation is also the industry standard for 3D representation in CAD packages where the engineering models are authored, and therefore contains necessary information for all kinds of geometric operations with required accuracy. However, BREP representation is heavy and frequently heavier than typical LOD representation. In addition, BREP surface representation in general can't be directly accepted by mainstream graphics APIs such as OpenGL and DirectX. Facet representation needs to be generated by BREP with a process commonly called tessellation, before the object can be displayed on screen. The speed of BREP tessellation is therefore critical for graphics performance. Including both LOD and BREP representations in the file would fulfill most graphics and geometry operations and requirements, but only at the cost of making the file size even bigger.

What is needed is a system, process, and method for a design representation that takes advantage of topological elements for arithmetic compression algorithms.

SUMMARY

To achieve the foregoing, and in accordance with the purpose of the presently preferred embodiment as broadly described herein, the present application provides a method for organizing elements for compression, comprising nesting a hierarchical topological structure having a plurality of elements; arranging said plurality of elements in a pattern to facilitate data compression; representing said pattern as four arrays; and compressing said plurality of elements from said arrays. The method, further comprising aggregating together a plurality of numerical values according to type. The method, wherein said data compression is lossy.

Another advantage of the presently preferred embodiment is to provide a computer-program product tangibly embodied in a machine readable medium to perform a method for organizing topology elements for compression, comprising instructions operable to cause a computer to nest a hierarchical topological structure having a plurality of elements; arrange said plurality of elements in a pattern to facilitate data compression; represent said pattern as four arrays; and compress said plurality of elements from said arrays. The computer-program product, further comprising instructions to aggregate together a plurality of numerical values according to type. The computer-program, wherein said data compression is lossy.

And another advantage of the presently preferred embodiment is to provide a method for organizing elements for compression, comprising: aggregating a plurality of values into characteristic types; traversing each of said characteristic types for identification of aggregated values; quantizing said plurality of values; compressing said quantized plurality of values along with said plurality of values that are of an integer characteristic type.

And yet another advantage of the presently preferred embodiment is to provide a A system for organizing elements for compression, comprising: an model representation; a type table having a plurality of characteristic types; a quantization engine; and a compression engine whereby said quantization engine and said compression engine compress a plurality of geometric elements from said model representation.

And still another advantage of the presently preferred embodiment is to provide a data processing system having at least a processor and accessible memory to implement a method for organizing elements for compression, comprising means for nesting a hierarchical topological structure having a plurality of elements; means for arranging said plurality of elements in a pattern to facilitate lossless data compression; means for representing said pattern as four arrays; and means for compressing said plurality of elements from said arrays.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 8:
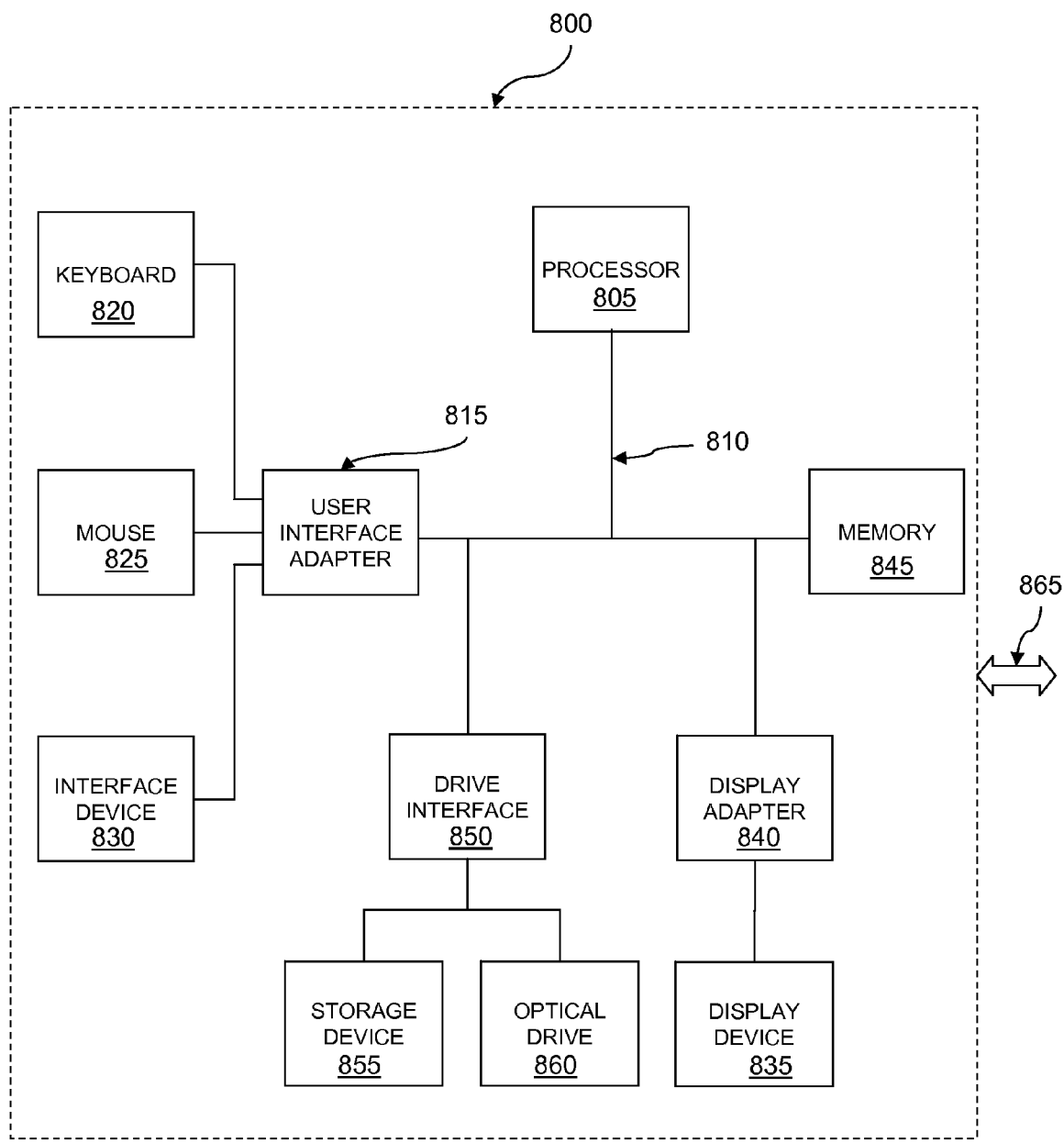
FIG. 8 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for organizing topology elements for better compression. Now therefore, in accordance with the presently preferred embodiment, an operating system executes on a computer, such as a general-purpose personal computer. FIG. 8 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 8, an exemplary system for implementing the presently preferred embodiment includes a general-purpose computing device in the form of a computer 800, such as a desktop or laptop computer, including a plurality of related peripheral devices (not depicted). The computer 800 includes a microprocessor 805 and a bus 810 employed to connect and enable communication between the microprocessor 805 and a plurality of components of the computer 800 in accordance with known techniques. The bus 810 may be any of several types of bus structures including a memory bus or memory controller, a peripheral bus, and a local bus using any of a variety of bus architectures. The computer 800 typically includes a user interface adapter 815, which connects the microprocessor 805 via the bus 810 to one or more interface devices, such as a keyboard 820, mouse 825, and/or other interface devices 830, which can be any user interface device, such as a touch sensitive screen, digitized pen entry pad, etc. The bus 810 also connects a display device 835, such as an LCD screen or monitor, to the microprocessor 805 via a display adapter 840. The bus 810 also connects the microprocessor 805 to a memory 845, which can include ROM, RAM, etc.

The computer 800 further includes a drive interface 850 that couples at least one storage device 855 and/or at least one optical drive 860 to the bus. The storage device 855 can include a hard disk drive, not shown, for reading and writing to a disk, a magnetic disk drive, not shown, for reading from or writing to a removable magnetic disk drive. Likewise the optical drive 860 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 800.

The computer 800 can communicate via a communications channel 865 with other computers or networks of computers. The computer 800 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 845 of the computer 800. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
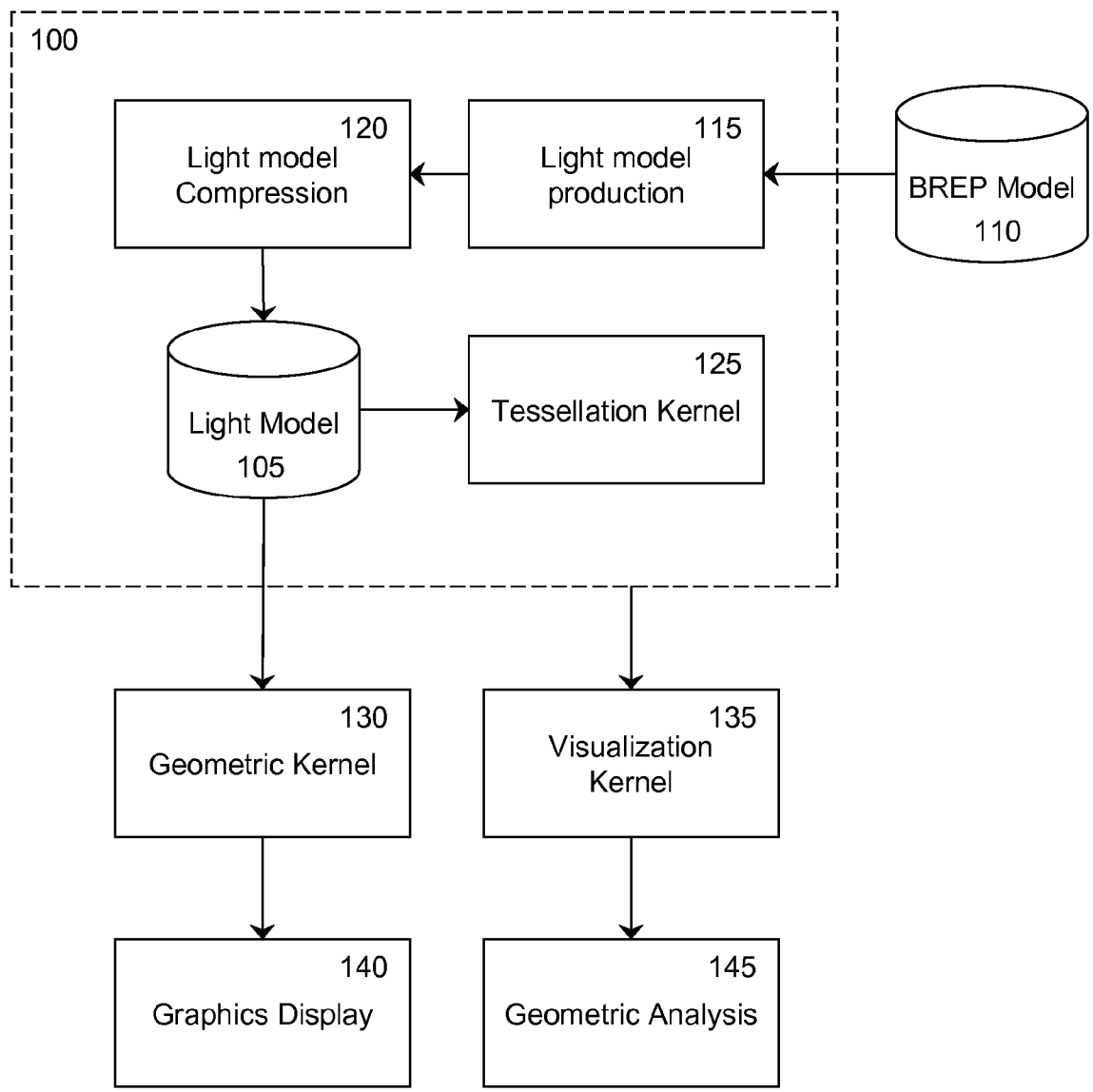
FIG. 1 is a flow diagram illustrating a visualization system.

FIG. 1 is a flow diagram illustrating a visualization system. Referring to FIG. 1, a light model visualization system, generally illustrated at 100, has a light model format stored on disk 105 produced from a BREP model 110 derived from CAD data by a light model production component 115, written to disk by a light model compression component 120, and consumed by a tessellation kernel 125, a visualization kernel 130, and a geometric kernel 135 to fulfill engineering visualization functions such as to a graphics display 140 or a geometric analysis 145.

Operation

Figure 2:
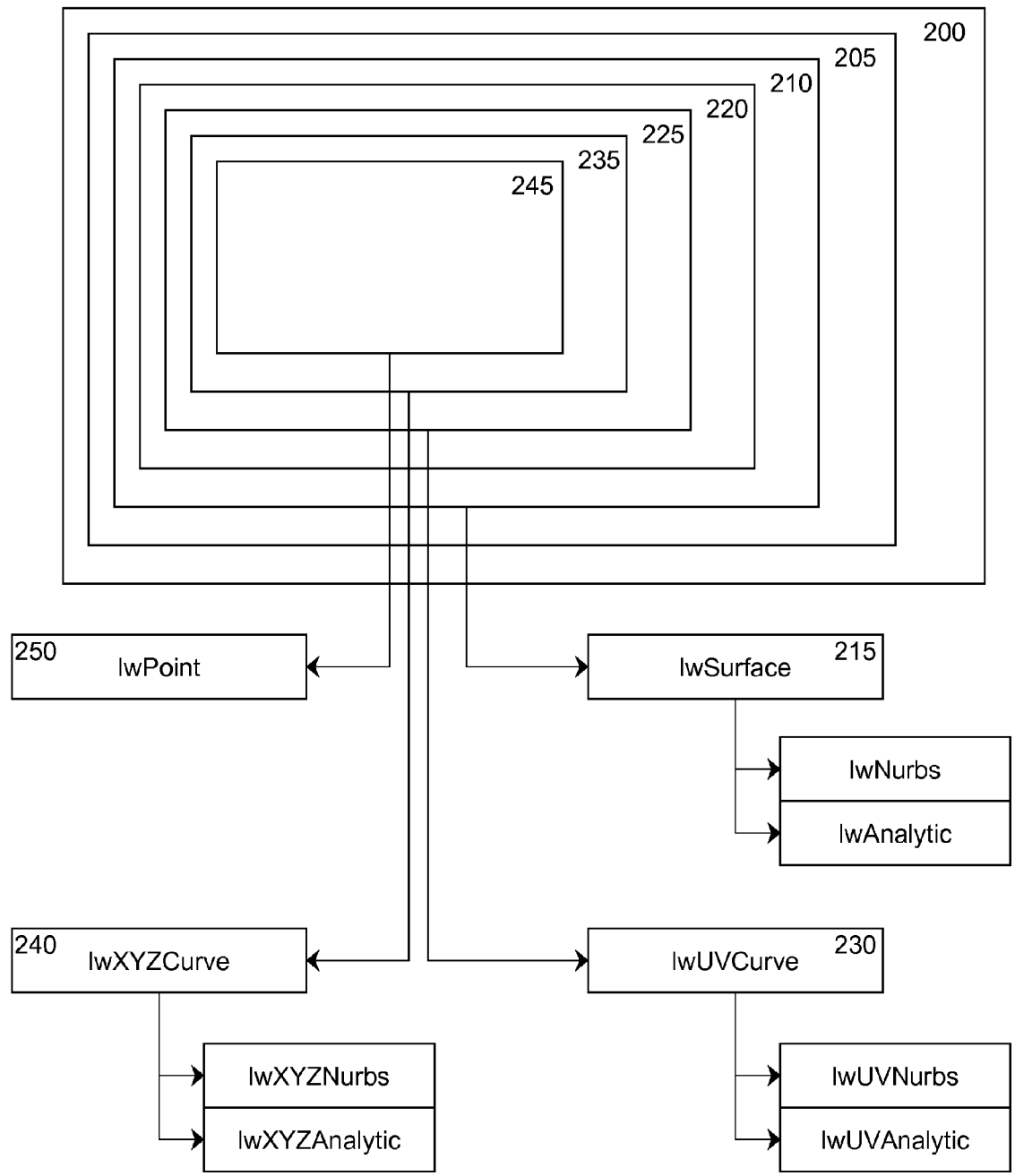
FIG. 2 is an illustration of a light model definition.

FIG. 2 is an illustration of a light model definition. Referring to FIG. 2, from a topological perspective, the light model definition 105 has a region 200 that contains one or more shells 205 each of which corresponds to an isolated three-dimensional (3D) object with manifold topology. Each shell 200 consists of a collection of faces 210 covering the manifold geometry. Each face 210 is associated with a surface 215 that describes its geometry in the 3D Euclidean space. The surface 215 representation is parametric, meaning that its geometry is the result of mapping from a rectangular box in 2D parametric space to 3D model space through a mapping function. The face geometry can be a trimmed portion of the surface geometry, and such trimming if it exists is represented by one anti-hole loop and zero or more hole loops in the parameter space, where the anti-hole loop contains all the hole loops, generally illustrated at 220. Each loop 220 consists of one or more coedges 225, and each coedge 225 has its geometry in the parametric space as a parametric space curve 230. The adjacency information between different faces is established between pairs of coedges. Assuming manifold geometry, each pair of coedges corresponds to a single edge 235 with geometry in the model space as a model space curve 240. The location where multiple edges 235 join is called a vertex 245 with geometry in the model space as a point 250. The geometric description of light model surfaces and curves is in parametric form, mapping from NURBS basis functions together with a set of control points to the parameterized description of analytic geometry. Example analytic geometric forms can be plane, cylinder, cone, sphere, and torus. Example analytic geometric forms in the parametric space curve 230 are UVline and UVcircle. Example analytic geometric forms in the model space curve 240 are XYZline and XYZcircle.

Figures 3, 4:
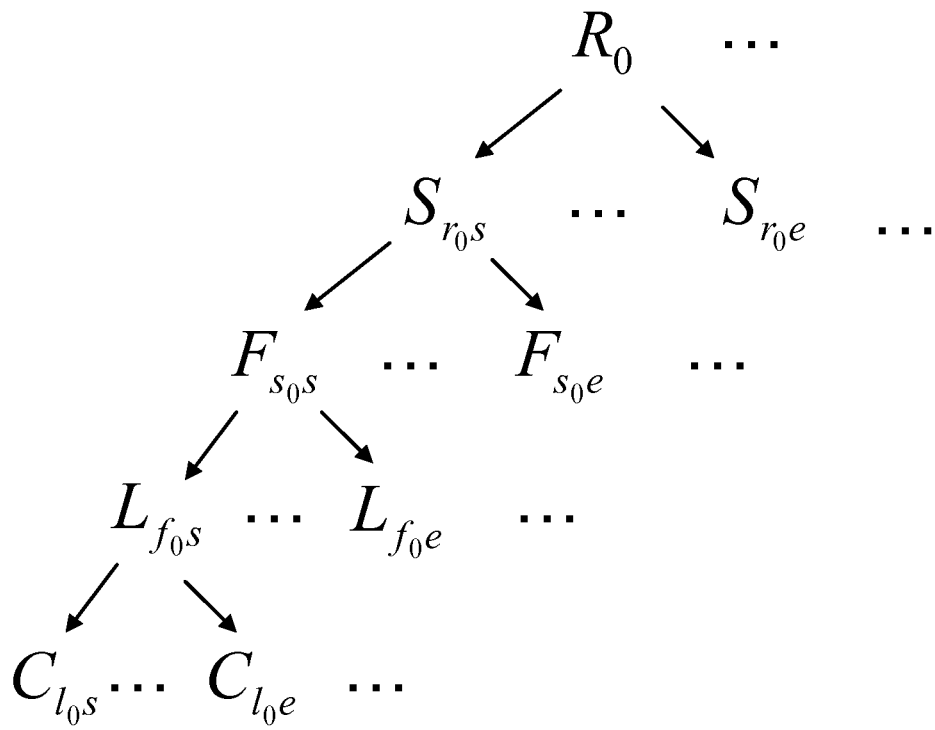
FIG. 3 is an illustration of a light logical topology structure.
FIG. 4 is an abstraction of a topology structure.

FIG. 3 is an illustration of a light model logical topology structure. Referring to FIG. 3, the hierarchical topological structure, where the first region 200 of the light model structure denoted as $R_0$ starts at shell 205 $S_{r_0 s}$ and ends at shell 205 $S_{r_1 e}$, in which shell 205 $S_{r_0 s}$ starts at face 210 $F_{s_0 s}$ and ends at face 210 $F_{s_0 e}$, face 210 $F_{s_0 s}$ starts at loop 220 $L_{f_0 s}$ and ends at loop 220 $L_{f_0 e}$, while loop 220 $L_{f_0 s}$ starts at coedge 225 $C_{l_0 s}$ and ends at coedge 225 $C_{l_0 e}$.

These elements are arranged in the following pattern to facilitate compression: (a) all the shells belonging to the same region are contiguous in a shell array; (b) all the faces belonging to the same shell are contiguous in a face array; (c) all the loops belonging to the same face are contiguous in a loop array; and (d) all the coedges belonging to the same loop are contiguous in a coedge array. This arranged pattern is expressed by mathematical formula as:

$r_k s = r_{k-1} e + 1, 0 < k < N_r$ $s_k s = s_{k-1} e + 1, 0 < k < N_s$ $f_k s = f_{k-1} e + 1, 0 < k < N_f$ $l_k s = l_{k-1} e + 1, 0 < k < N_l$ where $N_r$, $N_s$, $N_f$ and $N_l$ are the total number of regions 200, shells 205, faces 210, and loops 220 in the light model structure, respectively, and k is the index for each array.

FIG. 4 is an abstraction of a topology structure. Referring to FIG. 4, given the above pattern, the relationship can be represented as four integer arrays, one for each topology type:

$r_k n = r_k e - r_k s + 1, 0 <= k < N_r$ $s_k n = s_k e - s_k s + 1, 0 <= k < N_s$ $f_k n = f_k e - f_k s + 1, 0 <= k < N_f$ $l_k n = r_k e - r_k s + 1, 0 <= k < N_l$ where the first array is the region-shell relation, the second array is the shell-face relation, the third array is the face-loop relation, and the fourth array is the loop-coedge relation. There is a good chance that $N_x$, where $x = \{r, s, f, l\}$, in each array are of similar magnitude.

Figure 5:
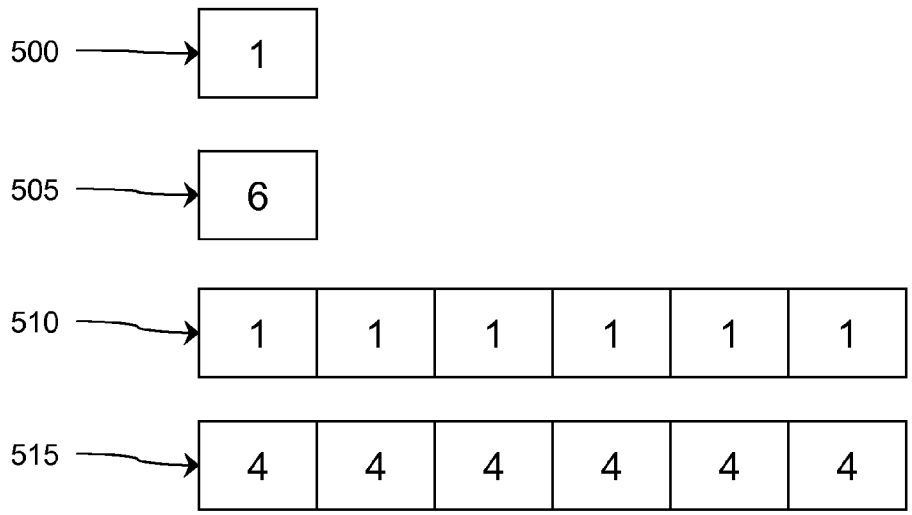
FIG. 5 is a illustration of an abstraction of topology structure for a cube topology.

FIG. 5 is an illustration of an abstraction of topology structure for a cube topology. Referring to FIG. 5 as an example, the arrays for a cube topology are defined by 1 region, 1 shell, 6 faces, 6 loops, and 24 coedges. The region-shell relation array is seen at 500 that indicates for one region, there is one shell. The shell-face relation array is seen at 505 that indicates for the one shell, there are six faces. With six entries for the faces, the face-loop relation array is seen at 510 that indicates for the six faces, there is one loop per face. The loop-coedge relation array is seen at 515 that indicates for the six faces, there are four coedges per loop. Because the index of each coedge must be contiguous in each loop, first loop has coedges with index 0 to 3, and the second loop has coedges with index 4 to 7, etc. The array elements contain a pattern that can be greatly compressed by currently available compression algorithms such as arithmetic coding.

Figure 6:
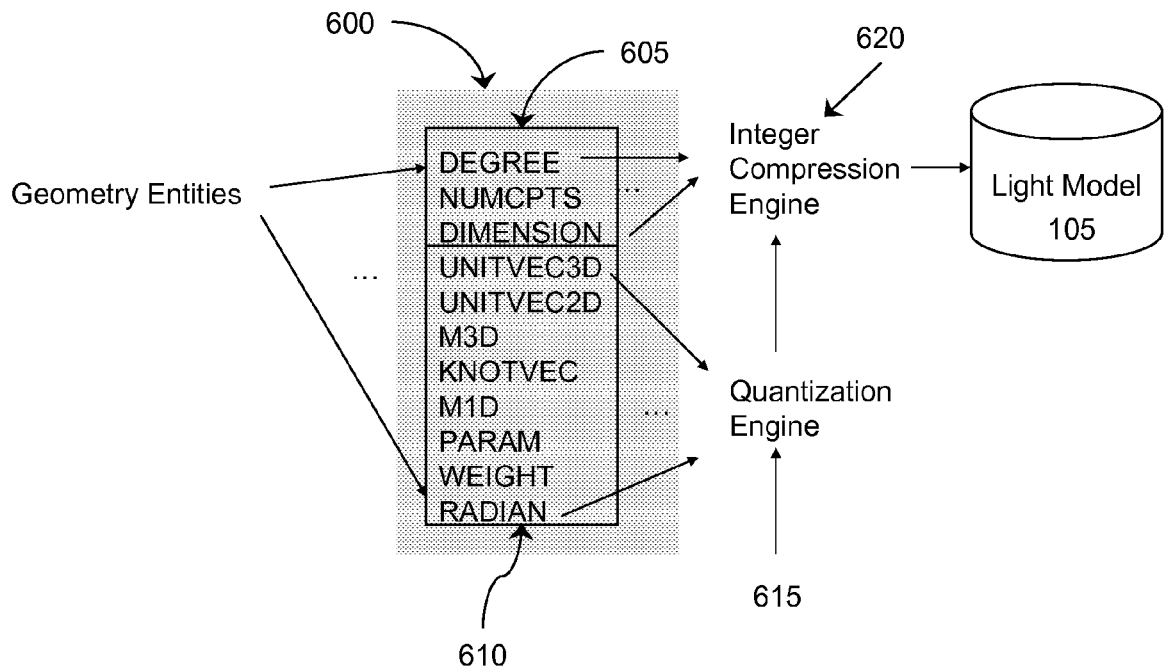
FIG. 6 is an illustration of organizing light model geometry data for better compression.

To take further advantage of one of the distinct characteristics of light model geometry is to aggregate together numerical values according to type. The geometry data in light model structure is classified into twelve types as shown in Table 1. By aggregating the values into types more patterns are provided that can be exploited by a lossy compression algorithm such as arithmetic compression for better compression. FIG. 6 is an illustration of organizing light model geometry data for better compression. Referring to FIG. 6, of the twelve types 600 in light model geometry data, the first three are of an integer characteristic 605, and the remaining nine have a more complex characteristic 610. On the more complex characteristics 610, the presently preferred embodiment passes each through a quantization engine 615 in any of the manners well understood in the art of lossy compression techniques. Likewise, those types identified by the integer characteristic 605 are passed to an integer compression engine 620 in a manner well understood in the art. According to the presently preferred embodiment, all of the integers that indicate "Degree of NURBS identity" (see Table 1, column description) are sequentially written on disk. Next, all of the integers that indicate "Number of control points of NURBS entity" are sequentially written on disk. This sequence preferably occurs according to the order of Table 1 so that numbers that are written sequentially are similar to each other in their expected values and such a pattern can be exploited by lossy compression algorithms to produce better compression results, as is understood in the art of compression algorithms.

TABLE 1

| Type name | Description | Characteristics in Libra |
|---|---|---|
| DEGREE | Degree of NURBS entity | positive Integer, most likely with value 2 or 3 |
| NUMCPTS | Number of control points of NURBS entity | positive Integer, most likely with value below 30 |
| DIMENSION | Dimension of NURBS entity | positive integer, with value between 2 to 4 |
| UNITVEC3D | Unit vector in 3d space | 3 dimension unit vector |
| UNITVEC2D | Unit vector in 2d space | 2 dimensional unit vector |
| M3D | Point coordinates in 3D model space | 3 dimensional point coordinates (magnitude can be larger than 1.0) |
| KNOTVEC | Knot vector of NURBS entity | Always clamped with starting value to be 0.0 to ending value to be 1.0 |
| M1D | Numerical values in 3D model space | A value in 3 dimensional space (magnitude can be larger than 1.0) |
| P2D | Point coordinates in 2D parameter space | 2 dimensional point coordinates (magnitude most likely between 0.0 and 1.0) |
| P1D | Numerical values in 2D parameter space | A value in 2 dimensional space (magnitude most likely between 0.0 and 1.0) |
| WEIGHT | Weight of control points of NURBS entity | Magnitude between 0.0 and 1.0, and likely repeated between adjacent entries |
| RADIAN | Angular values in radian | Magnitude most likely between 0.0 and 2 * PI |

Summary

Figure 7:
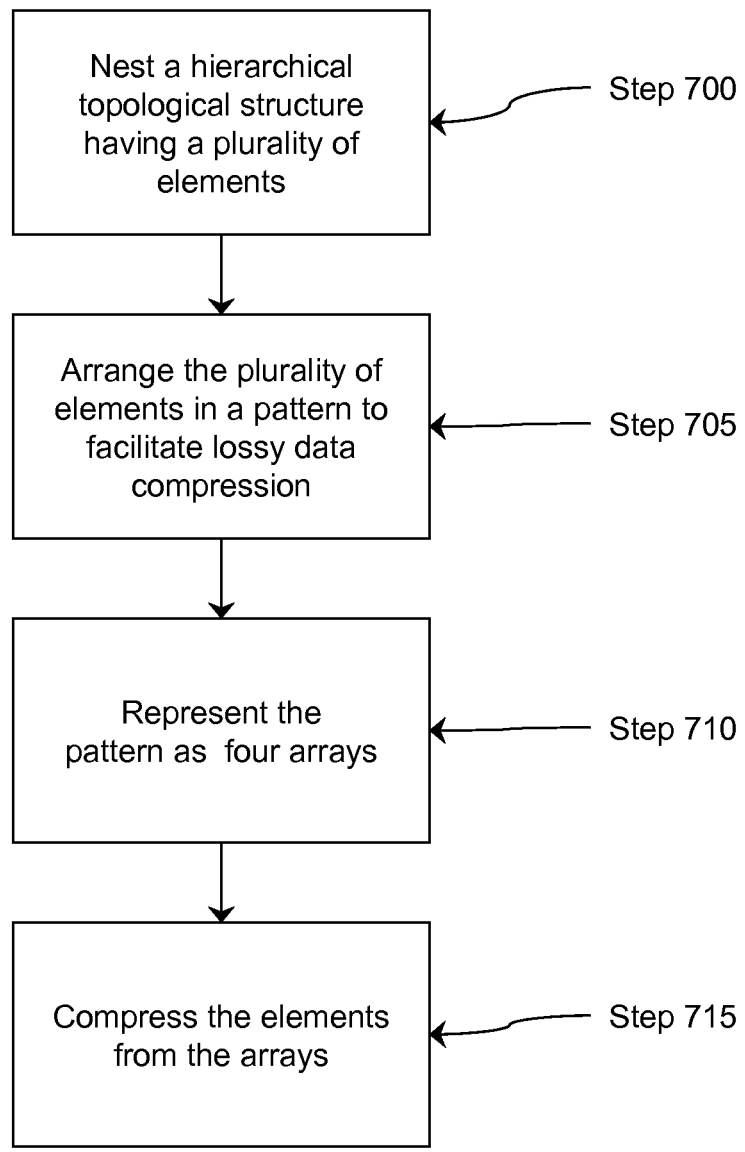
FIG. 7 is a flow chart of a technique employed by the presently preferred embodiment.

Given the system and operation, FIG. 7 is a technique for organizing topology elements for compression, beginning with nesting a hierarchical topological structure having a plurality of elements (Step 700). Next, arrange the plurality of elements in a pattern to facilitate lossy data compression (Step 705). Then represent the pattern as four arrays for each topological structure (Step 710). Lastly compress the elements from the arrays (Step 715). In an alternate embodiment also aggregate together a plurality of numerical values according to type for additional lossless compression.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method for organizing elements for compression, comprising:
   nesting, by a computing device, a hierarchical topological structure having a plurality of elements;
   arranging, by the computing device, said plurality of elements in a pattern to facilitate data compression;
   representing said pattern as four arrays by the computing device, the four arrays consisting of a shell array, a face array, a loop array, and a coedge array; and
   compressing, by the computing device, said plurality of elements from said arrays.

2. The method of claim 1, further comprising aggregating together a plurality of numerical values according to type.

3. The method of claim 1, wherein said data compression is lossy.

4. A method for organizing elements for compression, comprising:
   nesting, by a computing device, a hierarchical topological structure having a plurality of elements;
   arranging, by the computing device, said plurality of elements in a pattern to facilitate data compression;
   representing said pattern as four arrays by the computing device, the four arrays consisting of a shell array, a face array, a loop array, and a coedge array; and
   compressing said plurality of elements from said arrays by the computing device,
   wherein arranging said elements occurs in accordance with the equations:

$$r_k s = r_{k-1} e + 1, \ 0 < k < N_r$$

$$s_k s = s_{k-1} e + 1, \ 0 < k < N_s$$

$$f_k s = r_{k-1} e + 1, \ 0 < k < N_f$$

$$l_k s = r_{k-1} e + 1, \ 0 < k < N_l$$

where, $N_r$, $N_s$, $N_f$ and $N_l$ are the total number of regions, shells, faces, and loops in said structure, respectively, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

5. The method of claim 4, wherein representing said arrays occurs in accordance with the equations:

$$r_k n = r_k e - r_k s + 1, 0 <= k < N_r$$

$$s_k n = s_k e - s_k s + 1, 0 <= k < N_s$$

$$f_k n = f_k e - f_k s + 1, 0 <= k < N_f$$

$$l_k n = r_l e, -r_l s + 1, 0 <= k < N_l$$

where, $N_r$, $N_s$, $N_f$ and $N_l$ are the total number of regions, shells, faces, and loops in said structure, respectively, n indicates the specific structure, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

6. A method for organizing elements for compression, comprising:
nesting, by a computing device, a hierarchical topological structure having a plurality of elements;
arranging, by the computing device, said plurality of elements in a pattern to facilitate data compression;
representing said pattern as four arrays by the computing device, the four arrays consisting of a shell array, a face array, a loop array, and a coedge array; and
compressing said plurality of elements from said arrays by the computing device,
wherein representing said arrays occurs in accordance with the equations:

$$r_k n = r_k e - r_k s + 1, 0 <= k < N_r$$

$$s_k n = s_k e - s_k s + 1, 0 <= k < N_s$$

$$f_k n = f_k e - f_k s + 1, 0 <= k < N_f$$

$$l_k n = r_l e, -r_l s + 1, 0 <= k < N_l$$

where, $N_r$, $N_s$, $N_f$ and $N_l$ are the total number of regions, shells, faces, and loops in said structure, respectively, n indicates the specific structure, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

7. A non-transitory machine readable medium encoded with instructions operable to cause a computer to perform the steps of:
nesting a hierarchical topological structure having a plurality of elements;
arranging said plurality of elements in a pattern to facilitate data compression;
representing said pattern as four arrays, the four arrays consisting of a shell array, a face array, a loop array, and a coedge array; and
compressing said plurality of elements from said arrays.

8. The machine-readable medium of claim 7, further comprising aggregating together a plurality of numerical values according to type.

9. The machine-readable medium of claim 7, wherein said data compression is lossy.

10. A non-transitory machine readable medium encoded with instructions operable to cause a computer to perform the steps of:
nesting a hierarchical topological structure having a plurality of elements;
arranging said plurality of elements in a pattern to facilitate data compression;
representing said pattern as four arrays, the four arrays consisting of a shell array, a face array, a loop array, and a coedge array; and
compressing said plurality of elements from said arrays, wherein arranging said elements occurs in accordance with the equations:

$$r_k s = r_{k-1} e + 1, 0 < k < N_r$$

$$s_k s = s_{k-1} e + 1, 0 < k < N_s$$

$$f_k s = r_{k-1} e + 1, 0 < k < N_f$$

$$l_k s = r_{k-1} e + 1, 0 < k < N_l$$

where, $N_r$, $N_s$, $N_f$ and $N_l$ are the total number of regions, shells, faces, and loops in said structure, respectively, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

11. The machine-readable medium of claim 10, wherein representing said arrays occurs in accordance with the equations:

$$r_k n = r_k e - r_k s + 1, 0 <= k < N_r$$

$$s_k n = s_k e - s_k s + 1, 0 <= k < N_s$$

$$f_k n = f_k e - f_k s + 1, 0 <= k < N_f$$

$$l_k n = r_l e, -r_l s + 1, 0 <= k < N_l$$

where, $N_r$, $N_s$, $N_f$ and $N_l$ are the total number of regions, shells, faces, and loops in said structure, respectively, n indicates the specific structure, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

12. A non-transitory machine readable medium encoded with instructions operable to cause a computer to perform the steps of:
nesting a hierarchical topological structure having a plurality of elements;
arranging said plurality of elements in a pattern to facilitate data compression;
representing said pattern as four arrays, the four arrays consisting of a shell array, a face array, a loop array, and a coedge array; and
compressing said plurality of elements from said arrays, wherein representing said arrays occurs in accordance with the equations:

$$r_k n = r_k e - r_k s + 1, 0 <= k < N_r$$

$$s_k n = s_k e - s_k s + 1, 0 <= k < N_s$$

$f_k n = f_k e - f_k s + 1, 0 <= k < N_f$ $l_k n = r_l e, -r_l s + 1, 0 <= k < N_l$ where, $N_r$, $N_s$, $N_f$ and $N_l$ are the total number of regions, shells, faces, and loops in said structure, respectively, n indicates the specific structure, an r with a subscript represents a shell of a region, an s with a subscript represents face of a shell, an f with a subscript represents a loop of a face, an l with a subscript represents a coedge of a loop, an s without a subscript represents a starting element, an e represents an ending element, and k represents an array index.

13. A data processing system comprising
a processor; and
an accessible memory, the data processing system configured to
nest a hierarchical topological structure having a plurality of elements;
arrange said plurality of elements in a pattern to facilitate lossless data compression;
represent said pattern as four arrays, the four arrays consisting of a shell array, a face array, a loop array, and a coedge array; and
compress said plurality of elements from said arrays.

* * * * *